May 10, 1949.                C. T. GAYLEY.                2,469,382
                          WELDING EQUIPMENT
                          Filed Nov. 20, 1946

INVENTOR.
CHARLES T. GAYLEY
BY
ATTORNEY

Patented May 10, 1949

2,469,382

UNITED STATES PATENT OFFICE 2,469,382

WELDING EQUIPMENT

Charles T. Gayley, Lansdowne, Pa.

Application November 20, 1946, Serial No. 711,079

4 Claims. (Cl. 219—8)

(Granted under the act of March 3, 1883, as amended April 30, 1928; 370 O. G. 757)

This invention relates to welding equipment, and specifically to control equipment for governing the position of a movable electrode employed in welding.

An object of the invention is to provide control equipment that is simple, rugged, inexpensive to make, and easy to use.

Another object is to provide control equipment capable of maintaining a substantially constant voltage across the arc.

Another object is to provide control equipment that is effective to cause deposition of a predetermined quantity of welding-rod material per unit of length of the weld joint being made.

Another object is to provide control equipment responsive to the predominant one of two electrical voltages, at least one of which is variable.

Figure 1:
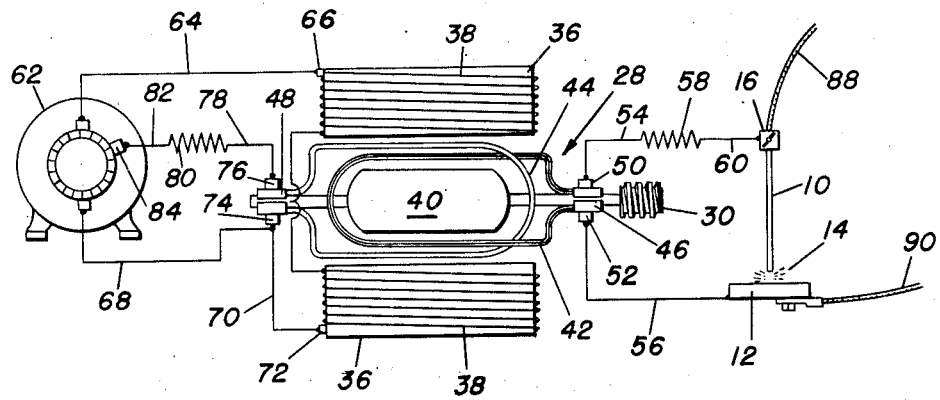
Figure 2:
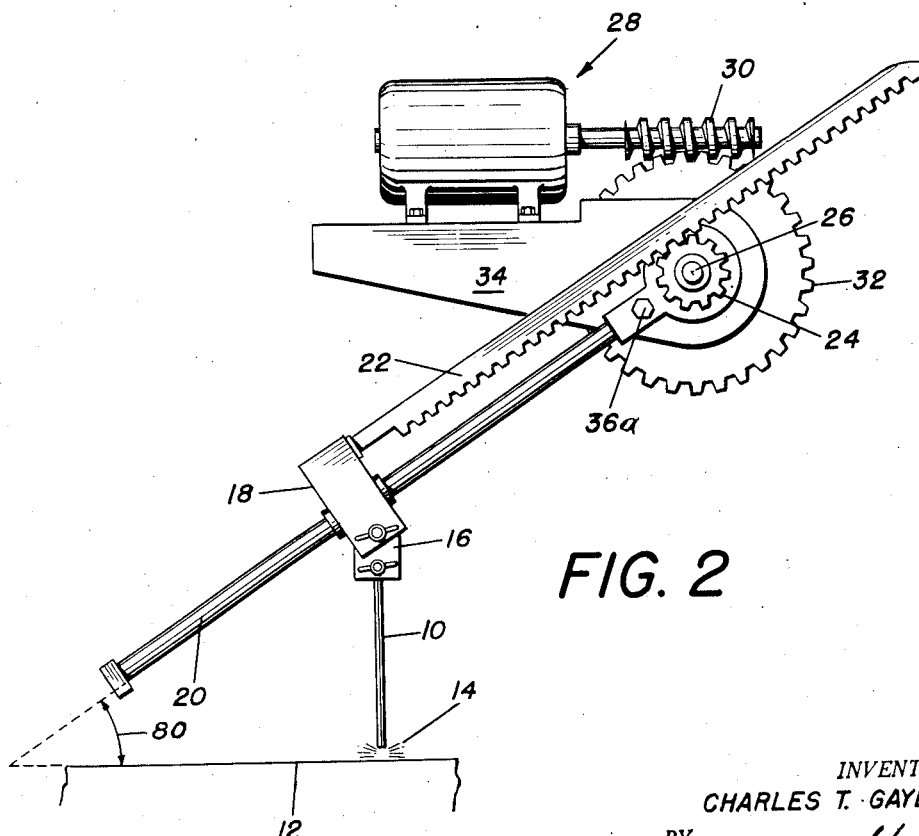

Further objects and advantages of this invention, as well as its construction, arrangement and operation will be apparent from the following description and claims in connection with the accompanying drawing in which:

Fig. 1 shows an electrical circuit employing a motor with two armature windings in conjunction with arc-welding apparatus, and Fig. 2 illustrates the physical arrangement of the motor of Fig. 1 and related mechanism for the positioning of a welding rod.

Electric arc welding is conventionally done with the movable electrode gripped in a holder that is manually guided along the work. This practice is followed, especially where small objects must be assembled to a more or less extensive structure, so that the setting up of a machine is not justifiable on the basis of time consumed for the results obtained.

In some applications, however, mechanical apparatus for guiding and feeding electrodes is highly desirable and its employment improves either the amount or the quality of work produced, or both. Such applications as the fabrication of metallic objects by welding together the component parts may justify construction of relatively complex and large machines, since the repetitive character of the work permits reduction of the operations to a mechanical routine which, when once established satisfactorily, can be repeated without the exercise of further judgment or ingenuity on the part of the operator.

Another consideration that favors mechanical as against manual control of the welding rod in some cases is the physical difficulty of performing the work because of the position that must be assumed or because of the lack of room or of adequate support for the operator. Again, the work sometimes involves a long straight or arcuate joint which could be welded with accuracy and dispatch by a mechanical apparatus, but which is tedious when the work is accomplished manually, and encourages inferior results. Furthermore, mechanical control can be utilized to take advantage of the best known conditions of operation, despite the fact that available operators lack either the experience or the competence to perform similar work manually.

For these and other reasons, there now is widespread acceptance of the principle of automatic controls for welding arcs. Such controls vary in complexity from a simple carriage device for supporting the weight of equipment and guiding it in the path of the joint to be welded, while the operator manually adjusts the arc length and the rate of depositing material, to production-line apparatus that receives several component parts of the product and assembles them into complete units, with a degree of uniformity and with a speed that can hardly be approached by human operators.

A handicap under which most of the existing automatic control mechanisms operate lies in their complexity and sometimes in the delicacy of constituent parts. Many such mechanisms rely for their operativeness on electronic tubes, delicate relays, careful adjustment of springs or balances, and other factors that contribute to complexity, fragility, and unreliability.

The present invention, on the other hand, utilizes only simple and sturdy apparatus, as will be evident from the following description and the annexed drawing, in which 10 is an electrode that is to be guided in proximity to a workpiece 12, and arc 14 being formed between the two. Electrode 10 is carried by a holder 16 adjustably fitted to a slide 18 that is carried on slide bar 20 and propelled along the slide bar by movement of rack 22 in response to rotation of pinion 24 mounted on shaft 26. Shaft 26 is driven in turn by gearing from motor 28, for example through worm 30 and worm wheel 32. Slide bar 20 is attached to foundation 34 so as to be rotatable with respect thereto about the axis of shaft 26 that carries pinion 24. Clamp 36a affords means for locking slide bar 20 at any desired angle with respect to said foundation, and indicia can be provided for showing such angle expressed in degrees or in a quantity such as inches per foot, the significance of which will be described later. Foundation 34 is suported with respect to workpiece 12 in any convenient manner, the detailed structure forming no part of this invention but comprising means appropriate to the situation.

Motor 28 comprises field poles 36, field windings 38, and armature 40 having two armature windings 42, 44, each with its respective commutator 46, 48. In the event that the welding is to be carried out with direct current, field poles 36 optionally can be of permanently magnetic material, and in that case field windings 38 can be omitted.

A preferred manner of connecting motor 28 to the welding circuit and to an auxiliary circuit is shown in Fig. 1, where one armature winding 42 is connected by way of its commutator 46 and brushes 50, 52 to leads 54, 56. Lead 54 is connected to resistance unit 58 and thence via lead 60 to electrode 10 at holder 16. Lead 56 is connected to workpiece 12. Winding 42 is thereby made responsive to voltage across arc 14. Field windings 38 (if used) are energized from auxiliary generator 62 via lead 64 to terminal 66 and via leads 68, 70 to terminal 72. Lead 68 also energizes brush 74 feeding one side of commutator 48 and second armature winding 44. The other side of said second armature winding and of commutator 48 are connected via brush 76, lead 78, resistance unit 80, and lead 82 to an adjustable voltage source such as third brush 84 on auxiliary generator 62. Power for the welding arc is brought from another source (not shown) via leads 88, 90. Polarity of input to armature winding 44 is selected so as to develop torque opposing that caused by current in winding 42 resulting from connection of the latter to arc voltage (between electrode 10 and workpiece 12) as hereinbefore described. Other methods of obtaining opposition of torques by the application of arc voltage to one commutator winding and of another, preferably adjustable, voltage to the other commutator winding will be readily apparent to any competent electrician. Resistance units 58 and 80 are each inserted in series with one of the two windings to limit the currents therein to values that do not cause damage to motor 28 even if the armature is at a standstill for a protracted period and no induced voltage is then being developed in the armature windings under the influence of the magnetic field set up between field poles 36. This precaution is desirable since the motor normally rotates at low speed the greater part of the time, as will be apparent later.

It should also be noted that considerable variation in the arrangement of mechanical drive is possible without departing from the principle here disclosed. For example, a lead screw and a follower nut may be substituted for rack 22 and pinion 24, and the drive from motor 28 can be direct, or via belting, sprockets and chain, spur gears, or other convenient means instead of worm 30 and worm wheel 32.

In the foregoing description it was stated that indicia can be provided in connection with adjustable clamping means 36a for showing the angular position of slide bar 20 expressed in degrees or in "inches per foot." The latter denotes a useful quantity related to the slope of slide bar 20 with respect to workpiece 12, and represents the number of inches of electrode 10 that is consumed in travelling one foot toward the left as viewed in Fig. 2. The indicia are designated with numbers corresponding to twelve times the tangent of angle 80a (from the relationship twelve inches equal one foot). Therefore it is readily apparent on the scale associated with clamp 36a that for a selected angle 80a an indicated length of welding rod 10 is consumed in making a weld joint one foot long on workpiece 12. Conversely, if a desired quantity of welding rod 10 is to be applied to workpiece 12 per foot length of weld joint, it is necessary only to set the slope of slide bar 20 so that this quantity is indicated, and the angle automatically is correct for the purpose.

In operation, suitable support is provided to position foundation 34 with respect to workpiece 12, and the slope of slide bar 20 is set to the desired angle as outlined above and then locked by application of clamp 36a. Electrode 10 is secured in holder 16 and connections are established in accordance with Fig. 1. Adjustable voltage for winding 44 is determined by trial or by reference to record of previous experience for analogous work, and third brush 84 on auxiliary generator 62 is set for the desired voltage. Upon energizing the main welding current source and also auxiliary generator 62, current appears in each winding of motor 28. The current in winding 42 corresponds initially to the open-circuit voltage of the main welding current source, which is a relatively large quantity, and predominates over the current in winding 44 from auxiliary generator 62. Motor 28 therefore runs in the direction to cause holder 16 to move downward and to the left as viewed in Fig. 2, and electrode 10 consequently is driven into contact with workpiece 12. When such contact is made, there is momentarily a short circuit across the main welding current source, the voltage energizing winding 42 drops to zero, and torque resulting from current in winding 44 is unopposed and causes rotation of armature in the opposite direction to withdraw electrode 10 from the workpiece. When physical contact is broken, arc 14 is set up and the voltage drop across the arc appears also across winding 42, thus reducing the net torque from what it was at the preceding moment when winding 44 was unopposed. With further withdrawal of the electrode, the arc voltage increases until a point is reached where torques attributable to currents in windings 42 and 44 balance each other, and the motor temporarily comes to a stop. Meanwhile, however, electrode 10 is being consumed by passage of arc current between the electrode and workpiece 12. The effect on the motor circuit is similar to a lengthening of the arc, causing a higher voltage and hence increased current in winding 42, so that the motor again feeds the electrode toward the work. However, the voltage is now considerably below open-circuit voltage, and the resultant torque from motor 28 approaches zero as the two component torques substantially balance each other. Equilibrium among the variable factors is attained when a small resultant torque exists in the direction that advances the electrode toward the work, the amount of torque being just sufficient to advance the electrode as fast as it is consumed. At this time rotation of the motor armature is slow and currents in the two windings simulate full-load conditions while actually opposing each other and producing a very small net output.

A discussion of the "inches per foot" indicia associated with slope angle of slide bar 20 is relevant at this point. Let it be assumed that the desired cross-section of welding bead on workpiece 12 is equal to the effective cross-section of electrode 10, making allowance for flux and slag. If that be the case, it is equivalent to stating that each inch of length of electrode consumed should be deposited along one inch of length of weld bead made, or, in other words, the electrode is consumed at the rate of twelve inches per foot of weld. The operator sets the slope of slide bar 20 so that the indicium marked "12" is indicated, and applies clamp 36a to maintain this slope. The said indicum "12" corresponds to a slope of 45°, this being the angle of which the tangent is unity (one-twelfth of the quantity that identifies the indicium). Should a heavier weld bead be desired, for example with a cross section 50% greater than that of the electrode, the slope of slide bar 20 may be set so that the indicium marked "18" is indicated, this indicium corresponding to a slope of approximately 56°, or that angle the tangent of which is 1.5 (one-twelfth of eighteen). Then eighteen inches of welding rod (electrode) will be deposited along twelve inches of weld bead on workpiece 12.

The adjustments are also useful in connection with carbon arc welding. In this case, material is not deposited from the electrode, but the latter is consumed by the passage of current, which vaporizes the carbon. Since motor 28 maintains a substantially constant arc length, as before described, and since a constant arc length corresponds to constant current and hence to substantially uniform rate of consumption of the electrode, the effect of varying the slope of slide bar 20 is to vary the speed at which the electrode travels across the work. The result is that with a high slope of the slide bar, the electrode dwells for a longer time in a small area of the work, whereas if the slope is low, the electrode moves quickly across the work. This condition affords means for regulating the degree of heat created in the region influenced by the arc.

Changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. Welding apparatus comprising means for holding an electrode, and means including an electric motor for moving said holding means relative to the weld, said electric motor having a field winding adapted for excitation from a source of constant voltage, said electric motor also having a pair of opposed armature windings, one of said armature windings being adapted for excitation from a source of constant and adjustable voltage, the other of said armature windings being adapted for excitation by the voltage across the welding arc.

2. Welding apparatus comprising means for holding an electrode, means including an electric motor for moving said holding means relative to the weld, said electric motor having a field winding, a source of constant voltage connected to excite said field winding, said electric motor having a pair of opposed armature windings, and a source of constant and adjustable voltage connected to excite one of said armature windings, the other armature winding being connected for excitation by the voltage across the welding arc.

3. Welding apparatus comprising means for holding an electrode with its longitudinal axis in a direction, means for guiding said holding means along a path at an angle with said direction and the line of weld, means for adjusting said guiding means to adjust said angle, indicating means connected with said adjusting means to indicate the length of welding rod consumed per unit length of weld, means including an electric motor for moving said holding means relative to the weld and along said guiding means, said electric motor having a field winding, a source of constant voltage connected to excite said field winding, said electric motor having a pair of opposed armature windings, and a source of constant and adjustable voltage connected to excite one of said armature windings, the other armature winding being connected for excitation by the voltage across the welding arc.

4. Welding apparatus comprising means for holding an electrode, and means including an electric motor for moving said holding means relative to the weld, said electric motor having a field winding adapted for excitation from a source of constant and adjustable voltage, said electric motor also having a pair of opposed armature windings, one of said armature windings being adapted for excitation from a source of constant and adjustable voltage, the other of said armature windings being adapted for excitation by the voltage across the welding arc.

CHARLES T. GAYLEY.

REFERENCES CITED

The following references are of record in the file of this patent:

UNITED STATES PATENTS

| Number | Name | Date |
|---|---|---|
| 645,784 | Bowen | Mar. 20, 1900 |
| 1,615,687 | Eschholz | Jan. 25, 1927 |
| 2,132,479 | Holslag | Oct. 11, 1938 |
| 2,269,485 | Ronay | Jan. 13, 1942 |
| 2,274,742 | Ronay | Mar. 3, 1942 |
| 2,387,864 | Tyrner | Oct. 30, 1945 |
| 2,427,744 | Rebuffoni | Sept. 23, 1947 |